(12) United States Patent
Pueblas

(10) Patent No.: US 7,770,217 B2
(45) Date of Patent: Aug. 3, 2010

(54) METHOD AND SYSTEM FOR QUALITY OF SERVICE BASED WEB FILTERING

(75) Inventor: Martin Christian Pueblas, Miami Beach, FL (US)

(73) Assignee: Cisco Technology, Inc., San Jose, CA (US)

(*) Notice: Subject to any disclaimer, the term of this patent is extended or adjusted under 35 U.S.C. 154(b) by 1005 days.

(21) Appl. No.: 11/361,506

(22) Filed: Feb. 23, 2006

(65) Prior Publication Data

US 2007/0199064 A1 Aug. 23, 2007

(51) Int. Cl.
*G06F 15/16* (2006.01)
*G06F 15/17* (2006.01)

(52) U.S. Cl. .................. 726/13; 709/240; 370/235
(58) Field of Classification Search ............ 726/13; 709/240; 370/235
See application file for complete search history.

(56) References Cited

U.S. PATENT DOCUMENTS

| 6,073,175 | A  | * | 6/2000  | Tavs et al. .................. 709/226 |
| 6,449,251 | B1 | * | 9/2002  | Awadallah et al. .......... 370/229 |
| 6,571,256 | B1 |   | 5/2003  | Dorian et al. ............. 707/104.1 |
| 6,594,268 | B1 | * | 7/2003  | Aukia et al. ................ 370/400 |
| 7,020,143 | B2 | * | 3/2006  | Zdan ...................... 370/395.21 |
| 7,188,188 | B1 | * | 3/2007  | Madhavapeddi et al. .... 709/238 |
| 7,246,173 | B2 | * | 7/2007  | Le et al. ..................... 709/238 |
| 7,287,275 | B2 | * | 10/2007 | Moskowitz ................. 726/13 |
| 7,308,501 | B2 | * | 12/2007 | DeLima et al. ............. 709/227 |
| 2002/0138643 | A1 | * | 9/2002 | Shin et al. .................. 709/232 |
| 2003/0014525 | A1 | * | 1/2003 | DeLima et al. ............. 709/227 |
| 2003/0067874 | A1 | * | 4/2003 | See et al. ................. 370/230.1 |
| 2003/0212900 | A1 | * | 11/2003 | Liu et al. .................... 713/200 |
| 2004/0100908 | A1 | * | 5/2004 | Khosravi et al. ............ 370/235 |

OTHER PUBLICATIONS www.junkbusters.com, "Bust the junk out of your web browsing," 2 pages total, Guidescope Inc., www.junkbusters.com/ijb.html.
www.logisense.com, "Cerberian and LogiSense Enter Strategic Alliance," 2 pages total, Logisense Corporation, www.logisens.com/pr/cerberian_alliance.html.
www.radware.com, "Radware Teams with Surfcontrol to Deliver Scalable and High Performance Internet Filtering," 3 pages total, Radware LTD., www.radware.com/content/company/press/pressrel/default.asp?_v=Read&document=2 115.

* cited by examiner

*Primary Examiner*—Kambiz Zand
*Assistant Examiner*—Michael Guirguis
(74) *Attorney, Agent, or Firm*—Stolowitz Ford Cowger LLP

(57) ABSTRACT

Methods and systems for QoS based Web filtering are described. A network access control device either permits or denies access to a web site. The network access control device also contains a mapping table which maps filtering categories to differentiated services values. When a web request is received by the network access control device, a query is sent to a web filtering server. The web filtering server returns a filtering category to the network access control device. The filtering category is mapped to a corresponding differentiated services value. The network access control device grants access privileges to the web request based on the differentiated services value.

20 Claims, 3 Drawing Sheets

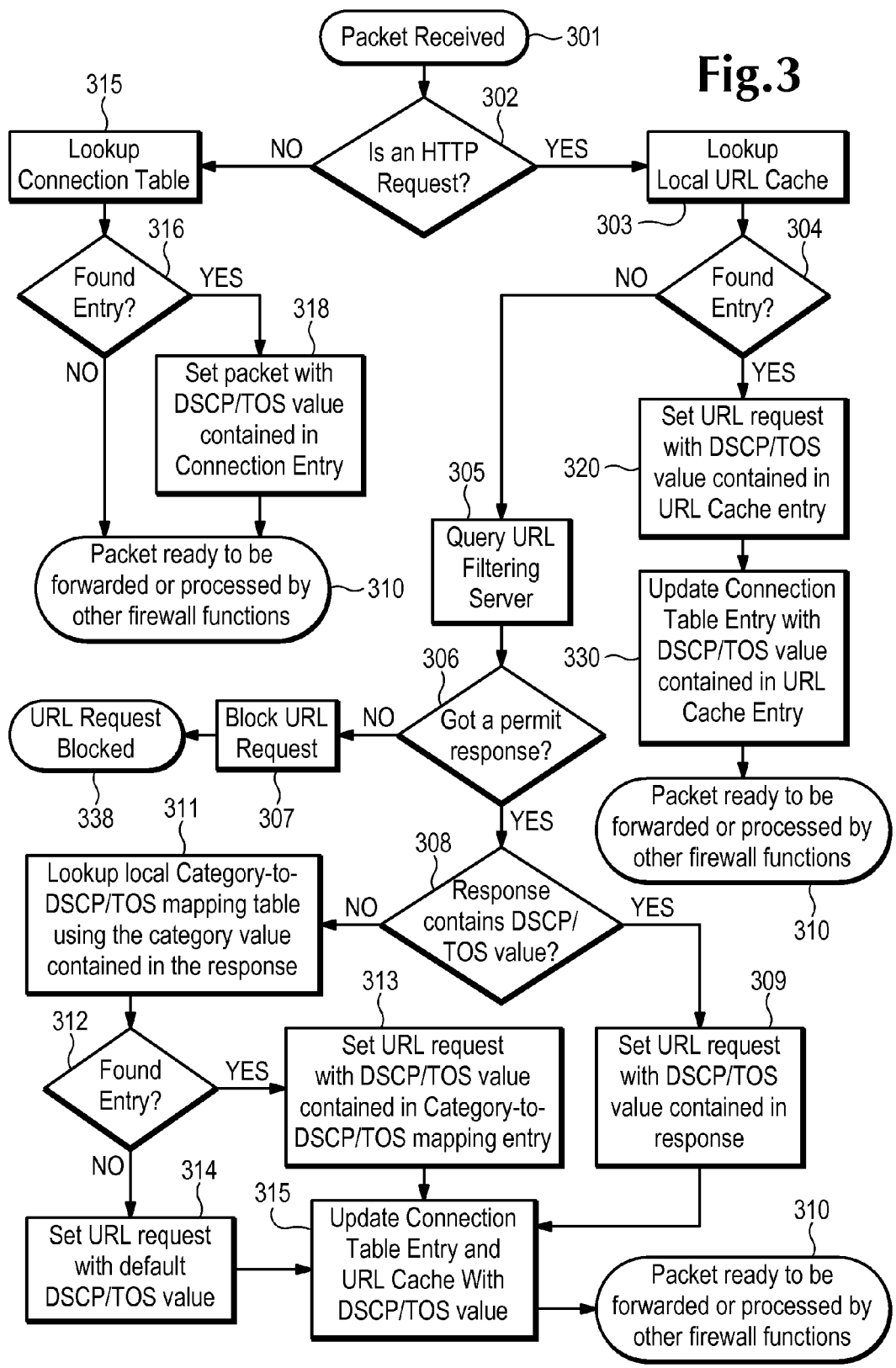

METHOD AND SYSTEM FOR QUALITY OF SERVICE BASED WEB FILTERING

TECHNOLOGY

The present invention relates generally to networking. More specifically, embodiments of the present invention relate to methods and systems for Quality of Service based Web filtering.

BACKGROUND

Modern user entities have become accustomed to ready access to the Web. With this widespread access and the variety of services available therewith, networked entities may use Quality of Service (QoS) based Web filtering to control their Web traffic. Web filtering typically operates by permitting or denying to a requestor access to a web site according to an identity or category associated therewith. Web filtering functions are typically performed with an external server, e.g., one that has little or no role in actual network access control functions, such as routing and switching, providing a firewall and related networking functions.

With finite bandwidth and the fact that some permitted websites, Web services, etc. may be more significant to an entity than others, QoS based Web filtering is performed to facilitate connectivity to websites that may be more significant to the entity than others. For example, a network entity may have a partnership or a similar enterprise relationship with one or more critical website partners. Ensuring connectivity with critical partners typically has a higher priority for the entity than for other websites that, while permitted, may be less significant to the operations of the entity.

Typical Web filtering solutions are implemented with a pass-through model. Clients' requests for Web pages pass through a network access control device (NACD) such as a firewall, proxy server, caching device, router, network switch, gateway or the like. Special agents running thereon communicate with a Web filtering server.

Upon receipt of a Hypertext Transfer Protocol (HTTP), File Transfer Protocol (FTP), Hypertext Transfer Protocol Secure (HTTPS), or other request for a webpage, the NACD queries a Web filtering server to ascertain whether the request should be permitted or denied. The Web filtering server then checks a policy assigned to the client making the request, makes a permit/deny decision accordingly. The Web filtering server sends a response corresponding to its permit/deny decision back to the NACD. An identifier representing a Web filtering related category associated with the requested site can be included. The NACD enforces the permit/deny decision with an action to allow or block the requestor's access to the requested website.

However, conventional web filtering solutions provide a simple binary granularity: a website is either permitted or blocked. The NACDs with Web filtering agents are typically implemented in the path between a client and servers on the network to which the client requests access. The Web filtering servers generally reside in an internal network segment that is accessible to the NACDs. Upon a HTTP or other request for a Universal Resource Locator (URL), conventional web filtering servers ascertain whether that URL is permissibly accessible to that user, or whether that user's requested access thereto should be blocked. The web filtering servers do not readily take the significance of the website to the entity into account.

To take the significance of the website to the entity into account, some conventional web filtering solutions attempt to control web access based on factors such as bandwidth and time usage. This however can add complexity and delay because it can require the implementation of a monitoring and enforcing mechanism in the network on top of (e.g., functional with, controlled by, etc.) the conventional web filtering function itself. Moreover, such conventional approaches do not integrate with existing and widely used networking prioritizing mechanisms such as Quality of Service (QoS) and can be prone to performance and scalability limitations.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description are not drawn to scale.

FIG. 3 depicts a flowchart of an exemplary process for performing QoS based web filtering, according to an embodiment of the present invention.

DETAILED DESCRIPTION

Figure 1:
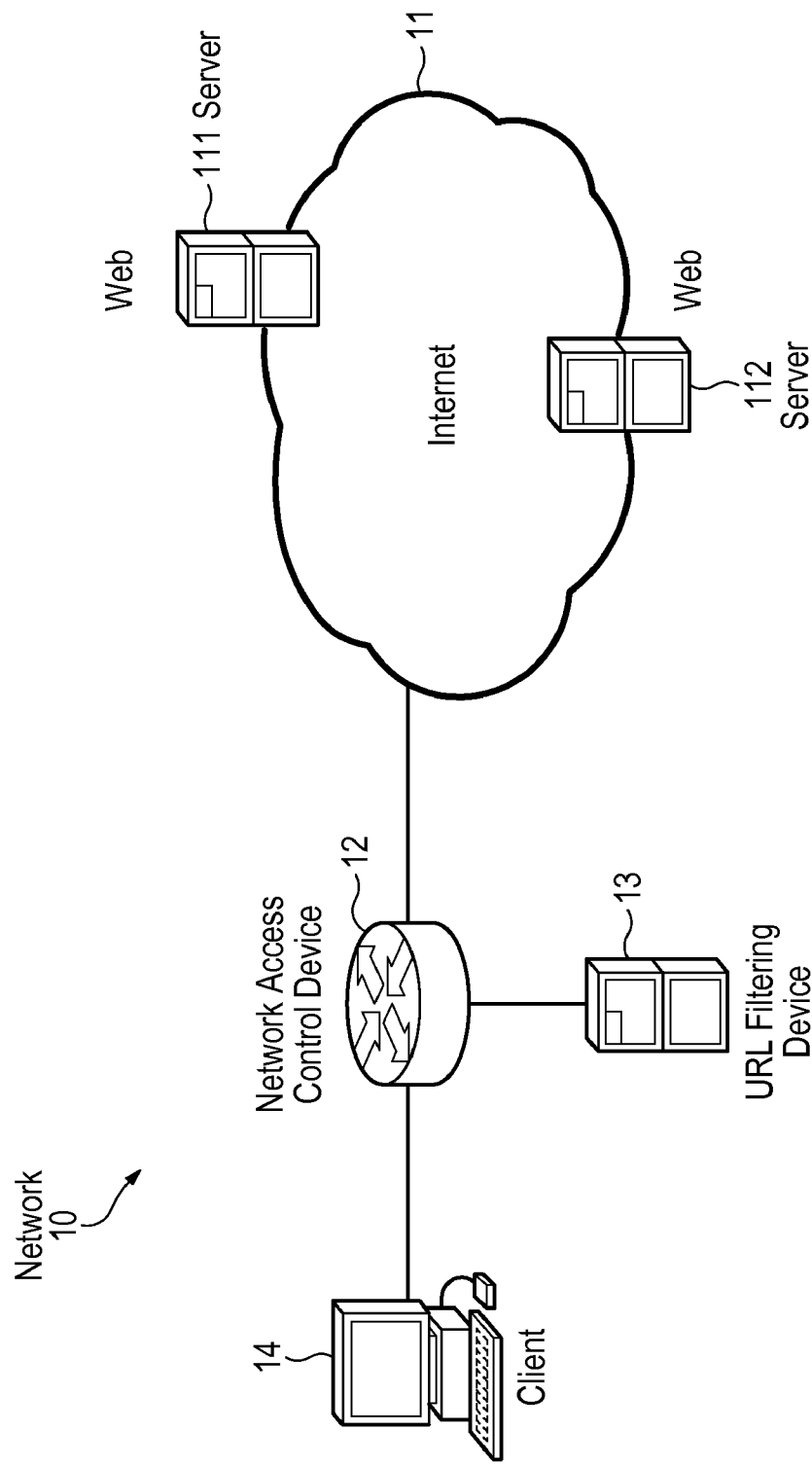
FIG. 1 depicts an exemplary web filtering topology with which an embodiment of the present invention can be used.

Exemplary embodiments of methods and systems for QoS based Web filtering are described below. Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims.

Furthermore, in the following detailed description of exemplary embodiments of the present invention, numerous specific details are set forth in order to provide a thorough understanding of the present invention. However, one of ordinary skill in the art will realize that embodiments of the present invention may be practiced without these specific details. In other instances, well-known devices, methods, systems, processes, procedures, components, circuits and apparatus, protocols, standards, etc. have not been described in detail so as not to unnecessarily obscure aspects of the present invention.

Portions of the detailed description that follows are presented and discussed in terms of processes. Although blocks and sequencing thereof are disclosed in flowchart figures herein (e.g., FIG. 3) describing the operations of these processes (e.g., processes 300), such blocks and sequencing are exemplary. Embodiments of the present invention are well suited to performing various other blocks or variations of the blocks recited in the flowchart of the figure herein, and in a sequence, order, etc. other than that depicted and described herein, except as described herein otherwise.

In one embodiment, such processes for QoS based Web filtering are performed with a computer based system. Means for performing such processes includes, in various embodiments, a variety of computer and networking systems, devices, apparatus and communication media, including but not limited to routers, network switches, firewalls, gateways, content and other servers, and access control devices, including software, hardware, firmware and/or combinations thereof. In one embodiment, such processes are performed with a computer under the control of computer readable code encoded upon (e.g., within) a computer readable medium. In one embodiment, such processes include a method for managing a network.

Embodiments of the present invention relate to methods and systems for QoS based Web filtering. Upon a Web related request, in one embodiment a map is dynamically accessed, which associates a Web filtering category associated with a Web site corresponding to the request with a differentiated services value associated therewith. Upon accessing the map, a differentiated services value is ascertained for the Web site corresponding to the request. The request is selectively permitted or denied on the basis of ascertaining the differentiated services value and related permissibility of access. Upon permitting access, packets associated with traffic related to the request are marked with the differentiated services value. The packet is handled according to the differentiated services value throughout the network, which promotes QoS enforcement and helps allocate resources adequate for the application provided with the Web site.

Therefore, embodiments of the present invention allow existing network resources to take into account the significance of a website to a network entity in providing a web filtering function. Embodiments of the present invention allow the existing network resources to take this significance of the website into account to provide web filtering functionality while fully integrating existing network Quality of Service (QoS) mechanisms. Embodiments of the present invention thus allow existing network resources to take into account the significance of a website to a network entity in providing a web filtering function without adding significant complexity or delay to the established networking functions.

FIG. 1 depicts an exemplary web filtering topology with which an embodiment of the present invention can be used. The web filtering topology is characterized by a network 10. Network 10 has a client computer 14, which accesses the internet 11 (e.g., and/or other external networks such as a wide area network) via a statefull network access control device (NACD) 12, such as a router, a network switch, a firewall, a gateway, a content server, etc. A filtering device 13 functions with NACD 12 and in one embodiment provides filtering functions based on a Universal Resource Locators (URL) associated with a requested website.

Client computer 14 has access to servers 111 and 112 via the internet 11. Client computer 14 requests access thereto by sending, in one embodiment, a Hyper Text Transfer Protocol (HTTP) based packet that addresses a URL corresponding to a website associated therewith. In one embodiment, packets can be File Transfer Protocol (FTP) based packets. In one embodiment, packets can be HTTP Secure (HTTPS) based packets. Packets can be based on other protocols.

Upon receipt of the request, NACD 12 queries Web filtering device 13 as to whether the Uniform Resource Locator (URL) associated with the requested Web site is allowed to be accessed by the particular client computer 14 that made the request for it. Web filtering device 12 responds to this query with the permissibility of access and a Web filtering category associated with the Web site. The Web filtering category is mapped with a differentiated services value, such as a Differential Services Control Point/Type of Service (DSCP/ToS) value, that is associated with the Web site. The mapping is stored, in one embodiment, at NACD 12. In another embodiment, the mapping is defined at a policy level in the Web filtering device 13.

More critical and less critical applications are differentiable for handling throughout network 11, e.g., by servers 111 and 112, on the basis of this mapped value. Quality of Service (QoS) enforcing mechanisms associated with network devices such as routers, network switches and the like throughout network 11 can be configured to enforce distinct rate limiting policies based on the differentiated services values, which are marked on all packet traffic related to the request. Advantageously, communications with Web sites deemed more critical can thus be allocated needed resources to promote connectivity and communicative effectiveness therewith.

Figure 2:
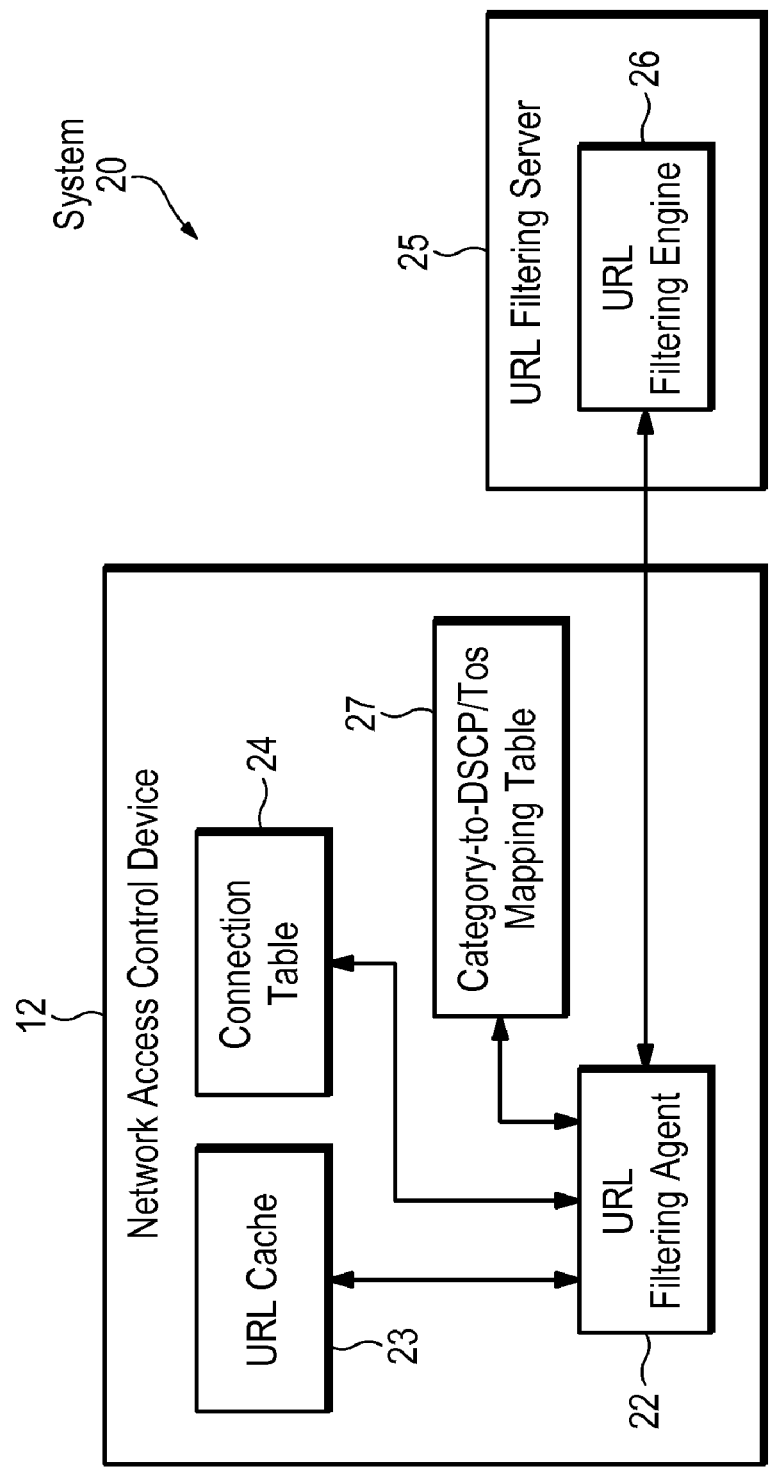
FIG. 2 depicts an exemplary system for performing a QoS based web filtering process, according to an embodiment of the present invention.

FIG. 2 depicts an exemplary system 20 for performing a QoS based web filtering process, according to an embodiment of the present invention. System 20 includes a network access control device (NACD) 12 for controlling access to a network. NACD 12 can be one or more of a firewall, a gateway, a proxy server, a caching device, a router, and a network switch. NACD 12 is networked (e.g., communicatively coupled and interactive) with a Web filtering server 25 (e.g., a URL filtering server, etc.).

Upon receiving an HTTP), FTP, HTTPS or similar request, NACD 12 queries Web filtering server 25 as to whether the URL associated with the requested Web site is allowed to be accessed by a particular user (e.g., a certain client computer) that requested it. URL filtering engine processes the query, decides on the permissibility of access, and responds therewith and with a category related to the Web site.

NACD 12 has a URL filtering agent 22, which in one embodiment comprises code that facilitates communication between NACD 12 and Web filtering server 25. NACD 12 has a URL cache 23, which stores recently accessed, allowed URLs. URL cache 23 maintains the DSCP/ToS mapping to improve the overall performance. These local caches typically contain the IP addresses of the web sites whose URLs are allowed to be accessed by all the users and hosts. Upon receipt of a request for a URL, NACD 12 checks URL cache 23 and can allow access on the basis of permissibility data stored therein. If cache 23 contains no information, NACD 12 will query the Web filtering server 25. Further, upon NACD 12 permitting access to a URL, filtering agent 22 creates an entry in cache 23. Consequently, firewalls with local caches, before sending queries to the URL Filtering Server 25, first look in their local URL Cache 23. In this context, the local cache should include a field with the associated DSCP/ToS value.

Connection table 24 maintains a tabulation of source and destination Internet Protocol (IP) addresses and ports (e.g., TCP, UDP, etc.). Importantly, in one embodiment the connection table further lists a differentiated services value, such as a DSCP/ToS value, associated with each connection. The combination of the connection table 24 in conjunction with the URL cache 23 enables the firewall or some other statefull device acting as a network access control device to map each filtering category to a pre-defined DSCP/TOS value. The firewall maintains the DSCP/TOS value for each filtering category as part of the firewall configuration.

Web sites are differentiable from each other. Some Web sites for instance may relate to applications of more importance, priority, etc. to the operation and functionality of a networked entity than other applications, which may relate to other Web sites. Web sites may thus be categorized. Web filtering server 25 categorizes Web sites on the basis of such priority of importance into a Web filtering category. In one embodiment, Web sites are categorized and assigned a differentiated service value (e.g., a DSCP/ToS value) corresponding to their category.

NACD 12 has a category-to-differentiated service value (e.g., DSCP/ToS) mapping table 27. The mapping between categories and DSCP/ToS values are preconfigured, either in the firewall or in the URL Filtering Server 25. In one embodiment, a map that associates a Web site's Web filtering category to its DSCP/ToS value or other differentiated service indicator is configured into category-DSCP/ToS mapping table 27, for instance by the action of a network administrator. A firewall administrator can be given the option to configure a DSCP/ToS value for each filtering category as part of the firewall configuration. Alternatively, the mapping can be defined at the policy level in the URL Filtering Server 25. In this case, the URL Filtering Server 25 returns a DSCP/ToS value along with the filtering category ID in each response. In one embodiment, upon a query by NACD 12 relating to a request, Web filtering server 25 responds with the permissibility of access and a Web filtering category associated with the Web site. In this embodiment, the mapping is defined at a policy level in the Web filtering device 25.

Thus, system 20 functions to filter a Web related request in a network and includes an NACD 12 for controlling access of a client to the network on the basis of a differentiated services value, which is mapped with a Web filtering category that is associated with a Web site corresponding to the request and for marking a packet associated with traffic related to the request with the differentiated services value, such that the packet is handled according to that value throughout the network. Web filtering server 25 is networked with NACD 12, assigns the Web filtering category to the Web site and, upon a query from the NACD 12, reports that Web filtering category and a permissibility of the request.

The NACD 12 can be a firewall, a proxy server, a caching device, a router, a gateway, a network switch or another network device. The differentiated service value, in one embodiment, comprises a Differential Services Control Point/Type of Service value. The Web related or other packet related to such a request substantially conforms, in one embodiment, with at least one of HTTP, FTP, HTTPS or a similar protocol.

After the mapping between filtering categories and DSCP/ToS values is configured, the firewall dynamically associates the appropriate DSCP/ToS values to the appropriate traffic flows as it processes requests. This is accomplished through the DSCP/ToS files in the firewall's connection table. Consequently, when the firewall intercepts a client request, it queries the URL Filter Server 25, which in turn, answers with a response containing an enforceable action (e.g., permit or deny) and the category ID within the initial mapping configuration. In other words, NACD 12 functions to access a map that associates the differentiated service value with the Web filtering category. Upon accessing the map, the NACD 12 determines the differentiated service value for the Web site corresponding to the request and selectively permits or denies the request on the basis of ascertaining the value and permissiveness of access. Upon permitting the request, the NACD 12 marks the packet with the differentiated service value. Advantageously, the packet is then handled in accordance with the value throughout the network, which promotes enforcement of QoS policies and helps allocate resources adequate for the application provided with the Web site.

Given that the firewall knows the DSCP/ToS of the corresponding connection, as described in detail above, it ensures that all packets are associated accordingly. One way for accomplishing this entails the firewall marking the first client request, since the server uses the same value. It should be noted that most protocol systems are supposed to reply packets with the same DSCP/ToS values as received. Another way entails instructing the firewall to mark all packets. This requires triggering a lookup for each packet. The firewall can accomplish this by running a lookup on its connection table as part of its normal statefull operation.

FIG. 3 depicts a flowchart of an exemplary process 300 for performing QoS based Web filtering, according to an embodiment of the present invention. In block 301, a packet is received by a device that controls access to a network (e.g., an NACD). In block 302, it is determined whether the packet comprises a request (e.g., HTTP, FTP, HTTPS, etc.). If so, a session is set and in block 303, the request is looked up in a URL cache local to the NACD.

In block 304 it is determined whether an entry, corresponding to the request, is found in the URL cache of the NACD. If so, then in block 320 the URL request is set with a differentiated services value (e.g., DSCP/ToS) value contained in the URL cache entry and in block 330, the connection table of the NACD is updated with the DSCP/ToS value contained therein. Then, in block 310, the packet is ready to be forwarded or processed with other functions of the NACD. If no cached entry is found, then in block 305 the NACD queries a URL filtering (e.g., Web filtering) server associated therewith.

In block 306, it is decided whether a permissive response to the query is received from the Web filtering server. If not, in block 307 action is taken to block the request and in block 338, the request is denied accordingly. If a permissive response is received, in block 308 it is determined whether the response contains (e.g., includes) a DSCP/ToS value or other differentiated services indicator. If so, in block 309, the URL request is set with the DSCP/ToS value contained in the response and in block 315, the connection table and URL cache of the NACD are updated with the DSCP/ToS value contained therein. Then in block 310, the packet is ready to be forwarded or processed with other functions of the NACD.

If the response had no DSCP/ToS value, then in block 311 the Web filtering category value returned in the response from the Web filtering server is used to look up a corresponding DSCP/ToS value from a mapping table, local to the NACD, which maps Web filtering categories to associated (e.g., corresponding) differentiated services values. In block 312, it is determined whether an entry is found in the mapping table.

If so, in block 313 the URL request is set with the DSCP/ToS value contained in the appropriate mapping entry of the table and in block 315, the connection table and URL cache of the NACD are updated with the DSCP/ToS value contained therein. If not, in block 314 the URL request is set with a default DSCP/ToS value and in block 315, the connection table and URL cache of the NACD are updated with the DSCP/ToS value contained therein. Upon updating the connection table and the URL cache with a DSCP/ToS value, in block 310, the packet is ready to be forwarded or processed with other functions of the NACD.

Importantly, upon forwarding, the packet is handled throughout the network in accordance with the DSCP/ToS value, which promotes enforcement of QoS and allocation of resources commensurate with the differentiated services value, e.g., relative importance of the URL to the networked entity. This means that the QoS mechanisms available on routers, switches and other network devices can be configured to enforce distinct rate limiting policies based on the Differentiated Services (Diffserv) values marked by the firewall.

If it is determined in block 302 that the packet is not an HTTP or similar request (e.g., where the packet comprises XML or other code), then a session is in progress and in block 315, the request is looked up in the connection table of the NACD. In block 316, it is determined whether a corresponding entry is found therein. If so, then in block 318 the packet is set with the DSCP/ToS value contained in the corresponding connection entry therein and in block 310, the packet is ready to be forwarded or processed with other functions of the NACD. Importantly, upon forwarding, this packet is also handled throughout the network in accordance with the DSCP/ToS value, which promotes enforcement of QoS and allocation of resources commensurate with its differentiated services value and relative importance of the URL to the networked entity. If no entry is found, then the packet the packet is processed with other functions of the NACD or forwarded as is.

Thus, process 300 functions for performing QoS based web filtering of a Web related request in a network, according to an embodiment of the present invention. Upon the Web related request, a map is dynamically accessed, which associates a Web filtering category associated with a Web site that corresponds to the request with a differentiated services value associated therewith. Upon accessing the map, a differentiated services value is ascertained for the Web site corresponding to the request.

The request is selectively permitted or denied on the basis of ascertaining the differentiated services value and related permissibility of access. Upon permitting access, packets associated with traffic related to the request are marked with the differentiated services value by an NACD allowing access of the packet to the network. Importantly, the packet is handled according to the differentiated services value throughout the network, which promotes QoS enforcement. Advantageously, this helps allocate resources adequate for the application provided with the Web site.

The map comprises, in one embodiment, preconfigured information. In one embodiment, the map is stored, cached, etc. at the NACD. In one embodiment, the map comprises information defined at a policy level in said Web filtering server. In this embodiment, in response to a query from the NACD relating to the request, the Web filtering server returns a mapping of said differentiated services value and a corresponding said Web filtering category to the NACD.

Process 300 further exemplifies a process for handling traffic in a network, according to an embodiment of the present invention. Upon receiving a Web related request from a client at an NACD, a map is dynamically accessed that associates a Web filtering category corresponding to a Web site related to the request with a differentiated services value associated therewith. Upon accessing the map, a differentiated services value for the Web site corresponding to said request is ascertained therefrom and the request is selectively permitted or denied on this basis and the permissibility of the client's access thereto. Upon permitting access, packets associated with traffic related to the request are marked with the differentiated services value. The packet is handled in accordance with the differentiated services value throughout the network.

Process 300 thus provides network management functions, which advantageously enforce QoS policies and allocate resources for handling packets related to the request throughout the network on the basis of the differentiated services value setting. Further, process 300 thus exemplifies a business method for providing networking services, wherein valuable consideration is charged for network access and the functionality accorded therewith.

Embodiments of the present invention, methods and systems for web filtering, are thus described. While the present invention has been described in particular embodiments, it should be appreciated that the present invention should not be construed as limited by such embodiments, but rather construed according to the following claims.

What is claimed is:

1. A method comprising:
   receiving, with a network access control device, a request for a web server to provide a client device access to a web site;
   transmitting, with the network access control device, information associated with the request over a network to a web filtering server external from the network access control device;
   receiving, with the network access control device, a response from the web filtering server over the network, wherein the response includes an indication of whether a client device is allowed access to the web site and includes a filtering category associated with the web site;
   utilizing, with the network access control device, the filtering category within the response to identify a differentiated services value from a mapping table in the network access control device, wherein the mapping table includes multiple filtering categories that are correlated to multiple differentiated services values; and
   when the response from the web filtering server indicates that the client device is allowed to access the web site, marking, with the network access control device, the request with the differentiated services value correlated with the filtering category, and forwarding the marked request towards the web server according to the differential services value associated with the request.

2. The method as recited in claim 1 wherein the request substantially conforms with one or more of Hyper Text Transfer Protocol, File Transfer Protocol and Hyper Text Transfer Protocol Secure.

3. The method as recited in claim 1 wherein the differentiated services value comprises a Differential Services Control Point/Type of Service value.

4. The method as recited in claim 1 further comprising caching the filtering category for the web site and the correlated differentiated services value within the network access control device.

5. The method as recited in claim 1 wherein the network access control device comprises at least one of a firewall, a proxy server, a caching device, a router, a gateway, or a switch.

6. The method as recited in claim 1 further comprising configuring the mapping table of the network access control device at a policy level in web filtering server associated with the network access control device.

7. The method as recited in claim 1 wherein the web filtering server is configured to assign the filtering category to the web site based on a relative importance of access to the web site to the operation or functionality of client devices.

8. A network access control device comprising:
   a first memory includes connection information, wherein the connection information includes source and destination IP addresses, port identification information, and differentiated services values;
   a second memory coupled to the first memory that includes information for mapping web filtering categories to differentiated services values; and
   a filtering agent coupled to the first memory and the second memory, wherein the filtering agent is configured to receive a request for a web server to provide access to a web site, send information associated with the request to a web filtering server over a network, and receive a response from the web filtering server over the network, wherein the response includes an indication of whether a client device is allowed access to the web site and includes a filtering category associated with the web site, wherein the filtering agent includes a mapping table having multiple filtering categories that are correlated to multiple differentiated services values, wherein the filtering agent is configured to utilizing the filtering category within the response to dynamically associate a differentiated service value to the filtering category with the mapping table, and wherein packets corresponding to the request are permitted selective access to the web site according to the differential service value.

9. The network access control device as recited in claim 8 wherein the differentiated service values comprise Differential Services Control Point/Type of Service values.

10. The network access control device as recited in claim 8 wherein the request substantially conforms to one or more of Hyper Text Transfer Protocol, File Transfer Protocol and Hyper Text Transfer Protocol Secure.

11. The network access control device as recited in claim 8 further comprising:
   a cache memory coupled to the filtering agent, wherein the cache memory stores a field of differentiated service values corresponding to recently allowed requests.

12. The network access control device as recited in claim 8 wherein the network access control device comprises at least one of a firewall, a proxy server, a caching device, a router, a gateway, or a network switch.

13. The network access control device as recited in claim 8 wherein the mapping table is configurable by a network administrator.

14. The network access control device as recited in claim 8 wherein the web filtering server is configured to assign the filtering category to the web site based on a relative importance of access to the web site to the operation or functionality of client devices.

15. An apparatus comprising:
   means for receiving a request for a web server to provide a client device access to a web site;
   means for controlling access to the web site based, at least in part, on information received over a network from a web filtering server external from the apparatus;
   means for sending information associated with the request over the network to the web filtering server;
   means for receiving a response from the web filtering server over the network, wherein the response includes an indication of whether a client device is allowed access to the web site and includes a filtering category associated with the web site;
   means for utilizing the filtering category within the response to identify a differentiated services value corresponding to the filtering category from a mapping table in the apparatus, wherein the mapping table includes multiple filtering categories that are correlated to multiple differentiated services values; and
   means for forwarding the request towards the web server according to the differential services value associated with the request when the response from the web filtering server indicates that the client device is allowed to access the web site.

16. The apparatus as recited in claim 15 wherein the differentiated service value comprises a Differential Services Control Point/Type of Service value.

17. The apparatus as recited in claim 15 wherein the request substantially conforms with one or more of Hyper Text Transfer Protocol, File Transfer Protocol and Hyper Text Transfer Protocol Secure.

18. The apparatus as recited in claim 15 further comprising:
   means for caching a field of differentiated service values corresponding to recently allowed requests.

19. The apparatus as recited in claim 15 wherein the means for controlling access to the web site comprising at least one of a firewall means, a proxy server means, a caching device means, a router means, a gateway means, or a network switching means.

20. The apparatus as recited in claim 15 wherein the web filtering server is configured to assign the filtering category to the web site based on a relative importance of access to the web site to the operation or functionality of client devices.

* * * * *